United States Patent [19]

Takei

[11] Patent Number: 5,675,195
[45] Date of Patent: Oct. 7, 1997

[54] LINEAR ELECTROMAGNETIC ACTUATOR AND A DRIVE UNIT ON WHICH IT IS EQUIPPED

[75] Inventor: Seiji Takei, Kanagawa, Japan

[73] Assignee: Nippon Thompson Co., Ltd., Tokyo, Japan

[21] Appl. No.: 462,896

[22] Filed: Jun. 5, 1995

[30] Foreign Application Priority Data

Jun. 20, 1994 [JP] Japan .................................. 6-160531

[51] Int. Cl.⁶ ............................. H02K 41/00; H05K 1/18
[52] U.S. Cl. ............................... 310/12; 310/71; 174/254
[58] Field of Search .............................. 310/12, 13, 14, 310/71; 174/254, 255, 261, 250; 361/749; 439/67

[56] References Cited

U.S. PATENT DOCUMENTS

| | | | |
|---|---|---|---|
| 4,987,442 | 1/1991 | Uemori | 355/50 |
| 5,317,220 | 5/1994 | Godkin | 310/12 |
| 5,606,256 | 2/1997 | Takei | 310/12 X |
| 5,615,088 | 3/1997 | Mizumo | 361/749 |

*Primary Examiner*—Steven L. Stephan
*Assistant Examiner*—Judson H. Jones
*Attorney, Agent, or Firm*—Sughrue, Mion, Zinn, Macpeak & Seas, PLLC

[57] ABSTRACT

A linear electromagnetic actuator and drive unit are described that ensure high durability for the wiring used for signal transmission, minimize the effect of the friction of said wiring on the operation of the moving portion to enable the obtaining of a highly precise operating state, achieve both reduced costs and compact size, and are able to maintain the function of the wiring itself for a long time.

The above effects are obtained by using a printed wiring substrate for the wiring, and providing a sliding member that guides the printed wiring substrate by sliding on it.

14 Claims, 9 Drawing Sheets

LINEAR ELECTROMAGNETIC ACTUATOR AND A DRIVE UNIT ON WHICH IT IS EQUIPPED

BACKGROUND OF THE INVENTION

1. Field of the Invention

The present invention relates to a linear electromagnetic actuator commonly used for moving an object to be moved with high accuracy in, for example, a motion mechanism such as a machine tool or industrial robot, and to a drive unit in which a guiding means for guiding an object is added to said linear electromagnetic actuator.

2. Description of the Prior Art

FIG. 1 shows an example of this type of drive unit of the prior art.

As shown in the drawing, said drive unit has a guiding device in the form of two track rails 2 fixed in parallel on base 1 in which tracks are formed along the respective lengthwise direction, and a slider 4 juxtapositioned over said track rails 2 and guided by said tracks. In addition, a linear electromagnetic actuator in the form of a linear pulse motor is used. Mutually coupled permanent magnets and electromagnets are composed on its primary side (not shown) and attached to the lower surface of the above-mentioned slider 4. The secondary side is composed of a rectangular plate-shaped member in which a plurality of inductor teeth (reference numeral not shown) having high magnetic permeability are formed to as to be arranged in the direction of the tracks. These inductor teeth and the above-mentioned electromagnet are made to be in opposition.

On the other hand, a detection device for detecting the relative positions of the above-mentioned primary side and secondary side is provided, and said detection device is composed in the manner described below. Furthermore, in the case of this example of the prior art, the secondary side 6 is stationary, while the primary side moves in the form of the moving side.

As shown in the drawing, said detection device has a detected portion in the form of linear magnetic scale 8 provided on base 1 so as to extend in the direction of movement of slider 4 attached to the above-mentioned primary side, and a detecting portion in the form of an electromagnetic conversion element (not shown) attached to the lower surface of slider 4 so as to correspond with said linear magnetic scale 8. Differing magnetic poles (N and S) are alternately and precisely arranged and magnetized in the lengthwise direction on said linear magnetic scale 8, and signals are generated corresponding to each of said magnetic poles from the above-mentioned electromagnetic conversion element that moves along said linear magnetic scale 8 together with slider 4, thus enabling slider 4, namely the position of the above-mentioned primary side, to be detected based on these signals.

Furthermore, in FIG. 1, reference numeral 9 indicates a cable guide that houses a connection cable (not shown) for supplying an electrical source to the electromagnet included in the above-mentioned primary side and transmitting signals emitted from the above-mentioned electromagnetic conversion element to the outside. As shown in the drawing, this cable guide 9 is composed by mutually linking a large number of links in series so as to be driven by pivoting freely, and acts to maintain said connection cable in a prescribed curved shape as well as protect the connection cable from being damaged even during movement of slider 4.

In the drive unit of the prior art described above, the durability of the above-mentioned connection cable (not shown) provided so as to transmit signals and so forth cannot always be said to be favorable due to the relatively large inertial force produced due to its own weight being applied whenever the drive unit is operated. Consequently, there is the risk of disconnection in the case of use over an extended period of time or when the operating frequency of slider 4 is high.

In addition, since the weight of the above-mentioned connection cable itself is somewhat large, and the weight relating to wiring is also large as a result of combining the above-mentioned cable guide 9, this weight produces resistance to the operation of the above-mentioned slider 4, thus resulting in the disadvantage of being unable to obtain high-precision operation.

In addition, since cable guide 9 having the above-mentioned constitution is considerably expensive, this results in another problem to be solved in terms of attempting to reduce the cost of the apparatus.

Moreover, since cable guide 9 occupies a large space, this becomes an obstacle to attempting to reduce the size of the apparatus.

SUMMARY OF THE INVENTION

In consideration of the above-mentioned disadvantages of the prior art, the object of the present invention is to provide a linear electromagnetic actuator and drive unit wherein the wiring for signal transmission and so forth is ensured to have high durability and the resistance produced by the wiring that has an effect on the operation of the moving portion is made to be as small as possible to allow the obtaining of a highly accurate operating state, while also achieving low cost and compact size. In addition to these objects, another object of the present invention is to maintain the function of the wiring itself for a long time.

The linear electromagnetic actuator according to the present invention has a flexible printed wiring substrate that transmits signals and so forth juxtapositioned in a bent state between primary and secondary sides that mutually perform relative movement, and is provided with a sliding member that can slide with respect to said printed wiring substrate between both ends of said printed wiring substrate, and has a small coefficient of friction so as to extend along the direction of said relative movement.

In addition, the drive unit according to the present invention is equipped with a linear electromagnetic actuator and a guiding device that guides the relative movement of the primary and secondary sides of said linear electromagnetic actuator, has a flexible printed wiring substrate that transmits signals and so forth juxtapositioned in a bent state between said primary and secondary sides, and is provided with a sliding member that can slide with respect to said printed wiring substrate between both ends of said printed wiring substrate, and has a small coefficient of friction so as to extend along the direction of said relative movement.

In said constitution, as a result of guiding of a printed wiring substrate being performed by a sliding member, when the printed wiring substrate follows the movement of the moving portion of the linear electromagnetic actuator or drive unit accompanying its movement, deflection into large or complex shapes is prevented.

DESCRIPTION OF THE PREFERRED EMBODIMENTS

The following provides an explanation of a drive unit as an embodiment of the present invention with reference to the attached drawings. Furthermore, said drive unit is composed by mutually adding a linear electromagnetic actuator in the form of a linear direct current motor and a guiding device that together with holding an object to be moved, guides the mutual operation of the primary and secondary sides of said linear direct current motor. In the case of the present embodiment, although a moving magnet type of linear direct current motor is employed for the linear electromagnetic actuator, various other types of linear electromagnetic actuators can naturally also be applied, examples of which include a moving coil type of linear direct current motor, linear pulse motor and voice coil motor.

First, an explanation is provided of the above-mentioned guiding device.

Figure 1:
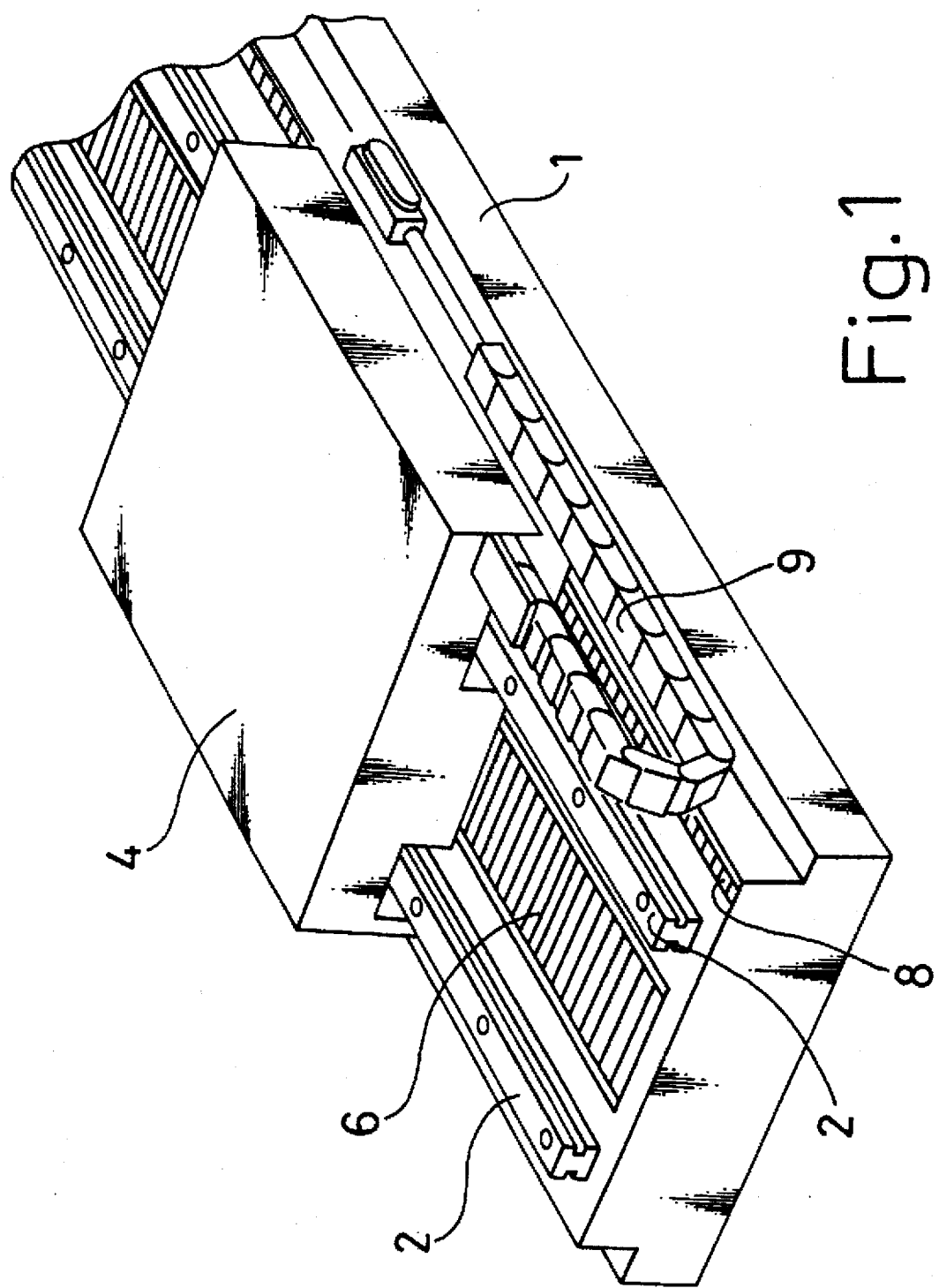
FIG. 1 is a perspective view of the essential portion of a drive unit of the prior art.
Figure 2:
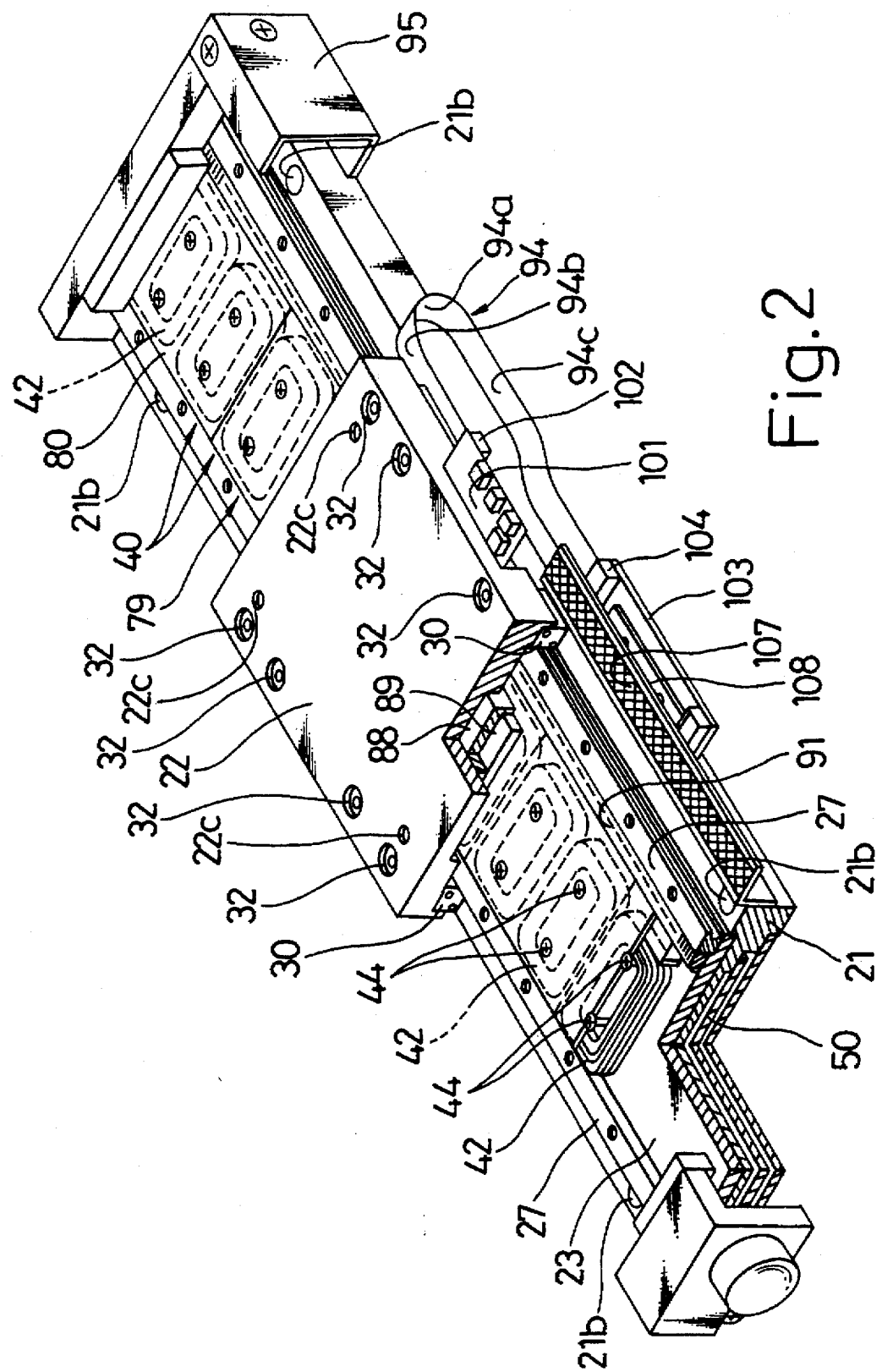
FIG. 2 is a perspective view, including a partial cross-section, of a drive unit as an embodiment of the present invention.
Figure 3:
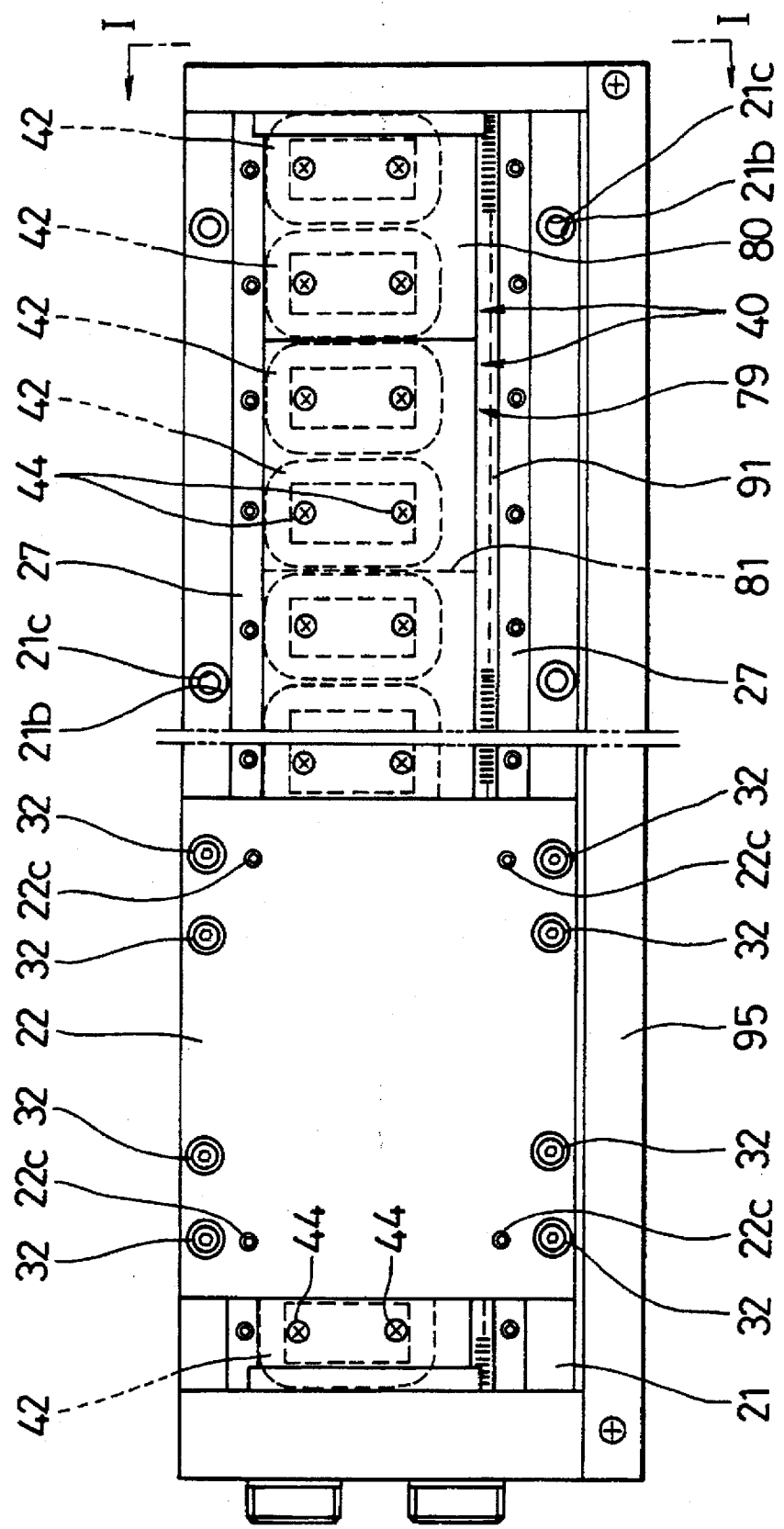
FIG. 3 is an overhead view of the drive unit shown in FIG. 2.
Figure 4:
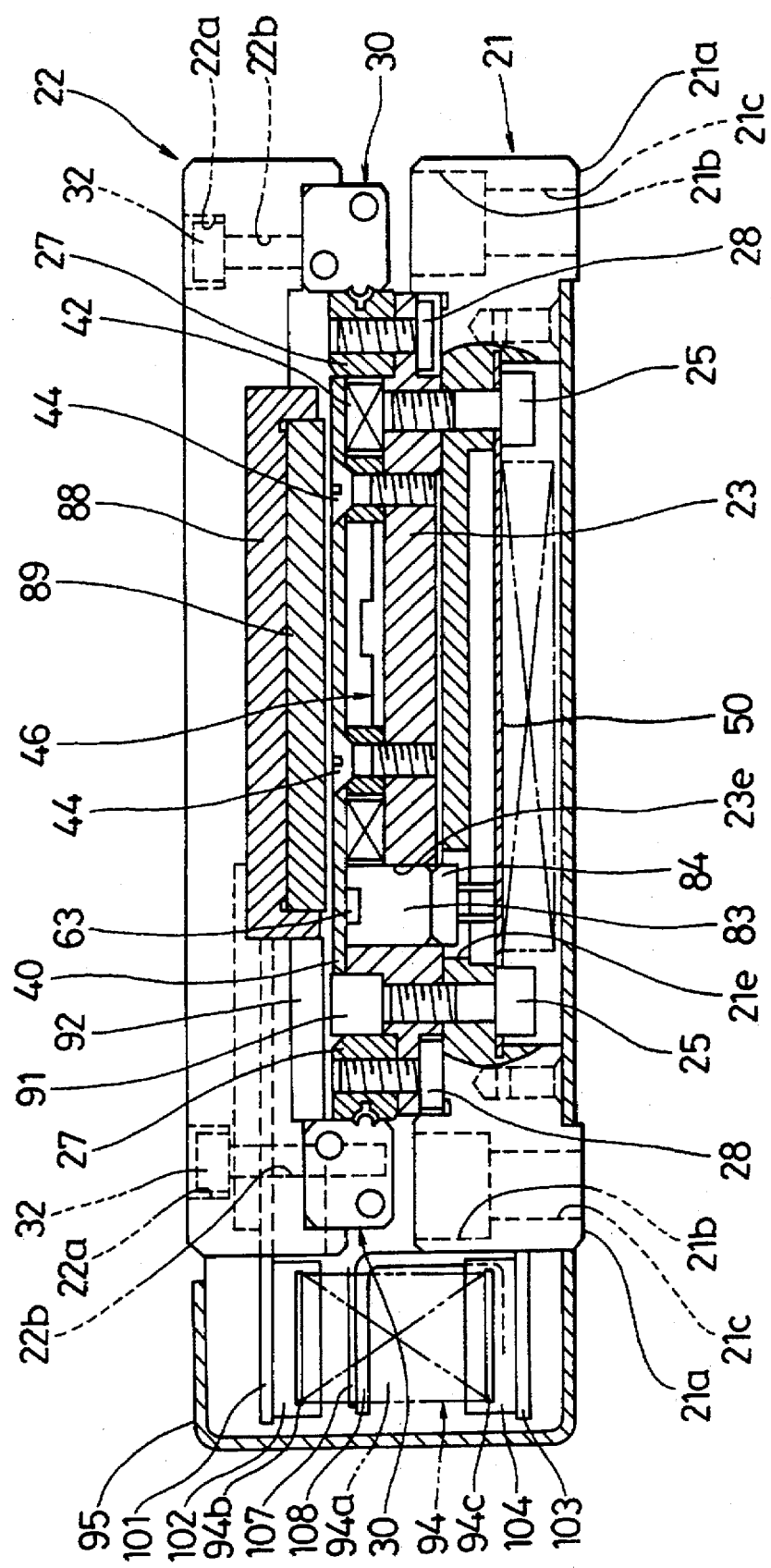
FIG. 4 is a view, including a partial cross-section, taken along arrows I—I relating to FIG. 3.

As shown in FIGS. 2 through 4, this guiding device has bed 21 formed roughly into the overall shape of a flat plate and table 22 to move along the lengthwise direction of said bed 21. As shown in FIGS. 2 and 4, coil yoke 23, formed into the shape of a flat plate and having nearly the same length as bed 21, is arranged on the upper surface of bed 21, and is fastened to said bed 21 by a plurality of bolts (with hexagon sockets, see FIG. 4) 25.

Two track rails 27 are arranged on both sides of the upper surface of said coil yoke 23 along the lengthwise direction of said coil yoke 23, and are fastened to said coil yoke 23 by a plurality of countersunk head screws 28 (see FIG. 4).

Figure 5:
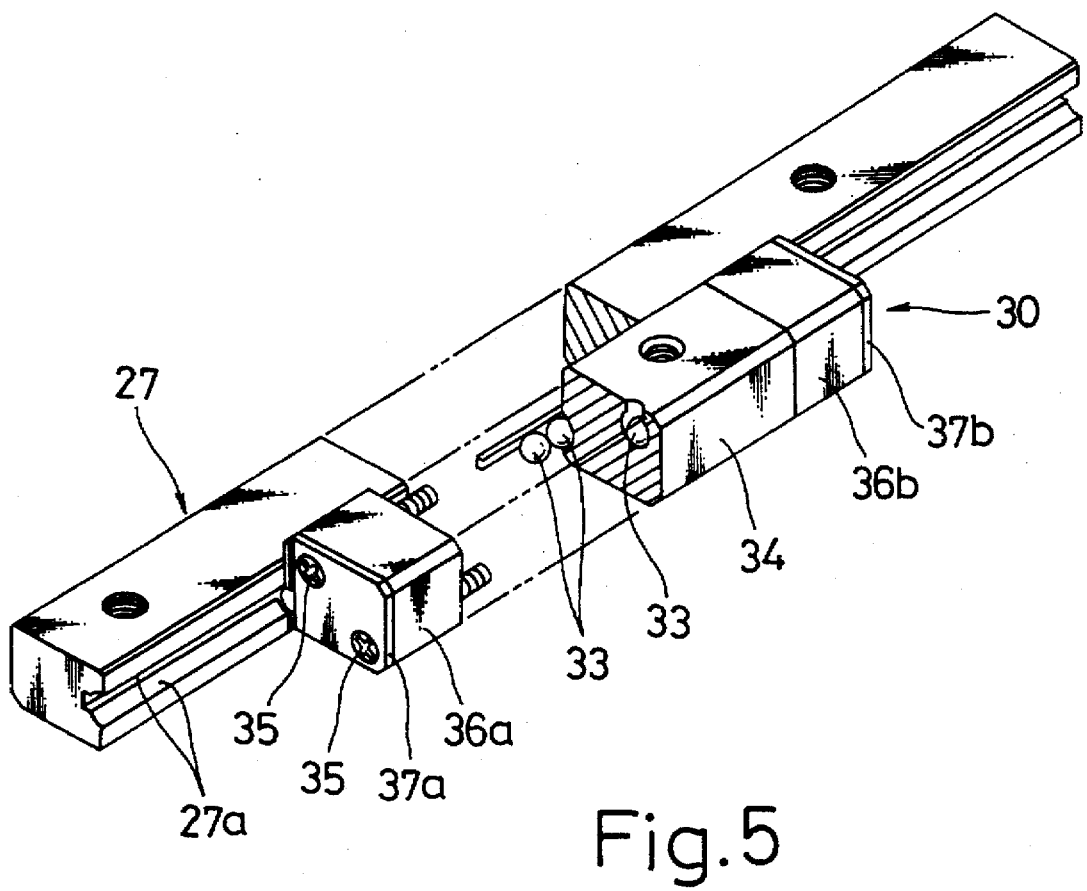
FIG. 5 is a perspective view, including a partial cross-section, of a track rail and slide member equipped on the drive unit shown in FIGS. 2 through 4.

As shown in FIG. 5, a track in the form of a single track groove 27a, having a roughly semi-circular shaped cross-section, is formed in the outside of the above-mentioned track rail 27. As is clear from FIGS. 2 and 4, a slider in the form of slide member 30, able to freely perform relative motion with respect to said track rail 27, is arranged on the outside of said track rail 27, and is fastened to the lower surface of table 22 by, for example, two bolts (with hexagon sockets) 32. Furthermore, as is clear from FIG. 4, countersunk portions 22a and insertion holes 22b are formed in table 22 into which the head portions and threaded portions, respectively, of bolts 32 are inserted. Bolts 32 are embedded in these countersunk portions 22a and insertion holes 22b, and do not protrude from the upper surface of table 22.

A rolling element circulating path (not shown) is formed in the above-mentioned slide member 30, and rolling elements in the form of a large number of balls 33 are arranged and contained within said rolling element circulating path. These balls 33 bear the load between track rail 27 and slide member 30 by circulating while rolling over track groove 27a of track rail 27 accompanying movement of slide member 30 with respect to track rail 27.

As shown in FIG. 5, the above-mentioned slide member 30 has casing 34, a pair of end caps 36a and 36b coupled to both ends of said casing 34 by countersunk head screws 35, and two seals 37a and 37b fastened to the outer surfaces of both of said end caps 36a and 36b. The above-mentioned rolling element circulating path is composed of a load bearing track groove and return path formed mutually in parallel and passing linearly through casing 34 in the lengthwise direction of said casing 34, and a pair of roughly arc-shaped direction changing paths formed in both end caps 36a and 36b that connect both ends of said load bearing track groove and return path. Furthermore, said load bearing track groove opposes track groove 27a of track rail 27.

The guiding device of the constitution described above is fastened to a flat mounting surface equipped on, for example, a machine tool (not shown) by a plurality of bolts (with hexagon sockets: not shown). Consequently, as shown in FIG. 4, bed 21 has flat mounting bottom surface 21a for anchoring said bed 21 to said mounting surface. As shown in FIGS. 2 through 4, countersunk portions 21b and insertion holes 21c are formed in both sides of bed 21 into which the head portions and threaded portions of the above-mentioned bolts for fastening said bed are respectively inserted. Said bolts are embedded in these countersunk portions 21b and insertion holes 21c, and do not protrude from the upper surface of bed 21. In addition, as shown in FIGS. 2 and 3, for example, four threaded holes 22c are formed in the four corners of the upper surface of table 22 able to move with respect to this bed 21, and a table (not shown) equipped on an apparatus, such as a machine tool, on which said drive unit is equipped is fastened to said table 22 by bolts (not shown) screwed into these threaded holes 22c.

Continuing, the following provides a detailed description of the primary and secondary sides of the direct current linear motor that composes the drive unit by being mutually added to a guiding device having the constitution described above.

Figure 6:
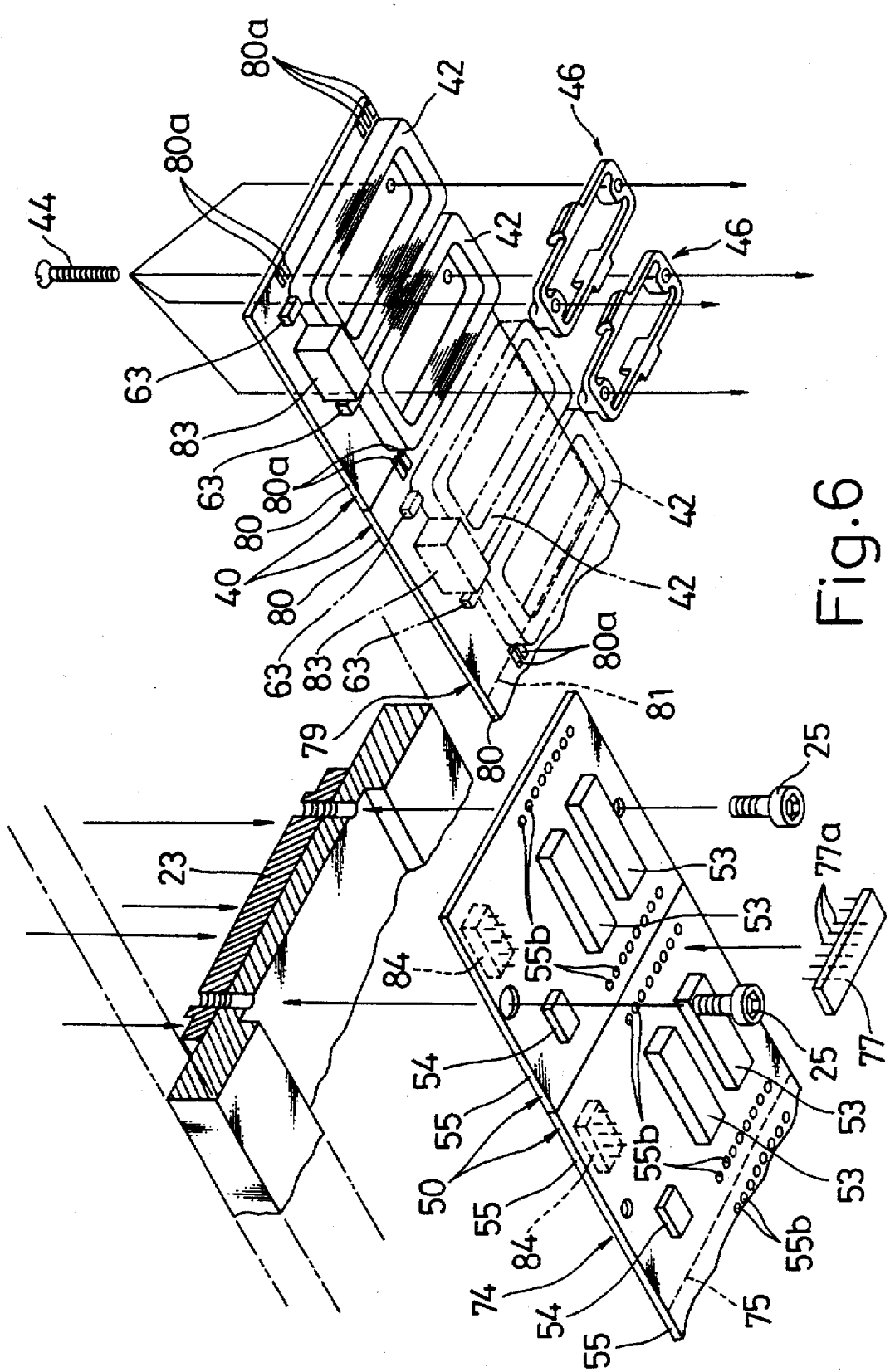
FIG. 6 is an exploded perspective view, including a partial cross-section, of the essential portion of a linear direct current motor contained in the drive unit shown in FIGS. 2 through 4.

To begin with, as shown in FIGS. 2 through 4 and 6, the primary side has the previously described coil yoke 23 installed on bed 21, coil substrate 40 arranged along the lengthwise direction of said coil yoke on the upper surface of said coil yoke 23, and, for example, 14 armature coils 42 supported by being affixed in a row along the direction in which the above-mentioned table 22 is to move over the lower surface of said coil substrate 40, namely the side of coil yoke 23. Furthermore, each armature coil 42 is wound into roughly the shape of a rectangular loop. In addition, as shown in FIGS. 4 and 6, Hall effect elements 63 are provided corresponding to each armature coil 42 on coil substrate 40.

Each of the above-mentioned armature coils 42 and coil substrate 40 are fastened together to coil yoke 23 with said coil substrate 40 to be outside by fastening members in the form of countersunk head screws 44, for example, two each of which are inserted for each of said armature coils 42.

As shown in FIGS. 4 and 6, spacer assemblies 46 are juxtaposed between coil substrate 40 fastened by countersunk head screws 44 and coil yoke 23 into which said countersunk head screws 44 are screwed. These spacer assemblies 46 are provided so that deformation, such as warping and so forth, does not occur in coil substrate 40 caused by tightening of countersunk head screws 44, and are fit inside each armature coil 42.

Next, the following provides an explanation of the circuit substrate for performing supply of electricity and so forth to each of the above-mentioned armature coils 42.

As shown in FIGS. 2, 4 and 6, circuit substrate 50 is arranged in parallel with coil substrate 40 on the lower surface of bed 21 on which said coil substrate 40 is installed on its upper surface with coil yoke 23 in between. Moreover, said circuit substrate 50 is fastened to bed 21 by a plurality of bolts (with hexagon sockets) 25. Furthermore, these bolts 25 also serve to fasten the above-mentioned coil yoke 23 to bed 21.

As shown in FIG. 6, the above-mentioned circuit substrate 50 is composed of a plurality of separate portions 55 joined together, each provided with a drive circuit composed of electronic components 53, 54 and so forth. These separate portions 55 are provided corresponding to each unit of two armature coils each of the fourteen armature coils 42 provided in a row. Thus, the number of these separate portions 55, in this case, is seven.

The drive circuit provided on each of the above-mentioned separate portions 55 contains one set of circuit portions supplying excitation current to one armature coil 42, or in other words, a circuit corresponding to two armature coils 42.

Continuing, the following provides a detailed description of the separate constitution of the above-mentioned circuit substrate 50 and coil substrate 40 arranged above it.

To begin with, the following provides an explanation of circuit substrate 50.

In the case of fabricating this circuit substrate 50, a base substrate K 74, having a base length, is made available (a portion of which is shown in FIG. 6). This base substrate K 74 is composed of, for example, six separate portions 55, explained based on FIG. 6, joined into a single unit. As was previously described, these separate portions 55 are provided with a drive circuit that performs supply of electricity and so forth to two armature coils, two of each of which are grouped into individual units. Furthermore, as is shown in FIG. 6, marks in the form of broken lines 75 are printed on both the top and bottom surfaces of base substrate K 74 (only the bottom surface is shown in the drawing) for distinguishing each separate portion 55.

Since the previously described circuit substrate 50 must link together seven of the above-mentioned separate portions 55, said circuit substrate 50 is completed by severing one of the six separate portions 55 possessed by the above-mentioned base substrate K 74 along broken line 75 to separate, arranging this separated separate portion 55 in a row at one end of unseparated base substrate K 74 as shown in FIG. 6, and mutually connecting their corresponding connection terminals.

Furthermore, in FIG. 6, connection between the above-mentioned separate portions 55 and base substrate K 74 is performed by a single connection component 77 having terminals 77a fit into through holes 55b provided at the portion of both connection terminals 55a. Furthermore, although connection between corresponding connection terminals 55a may be performed using copper wire and so forth, by performing connection using these connection components, in addition to connection of connection terminals 55a being able to be performed all at once, connections are reinforced due to the rigidity of said connection components 77. Moreover, in addition to using components that simply act to make electrical connections, electronic components such as IC and so forth may also be used for connection components 77.

The following provides an explanation of coil substrate 40.

Although the overall coil substrate 40 is not shown, in the case of fabricating this coil substrate 40, a base substrate C 79 of a length nearly equal to base substrate K 74 for the above-mentioned circuit substrate 50 is made available as shown in FIG. 6. This base substrate C 79 is composed by linking together six separate portions 80 into a single unit in the same manner as base substrate K 74 for circuit substrate 50. As shown in the drawing, two armature coils 42 each are affixed, grouped together in units, on these six separate portions 80, thus making the total number of armature coils 42 arranged in a row on base substrate C 79 twelve. Furthermore, as shown in FIGS. 6 and 3, marks in the form of broken lines 81 are printed on the top and bottom surfaces of base substrate C 79 to distinguish these separate portions 80. As shown in FIG. 6, circuit substrate 50 is formed by joining and connecting a single separate portion 80 separated from another base substrate not shown to one end of this unseparated base substrate C 79. Furthermore, in FIG. 6, reference numeral 80a indicates connection terminals provided on each separate portion 80.

Furthermore, in the description thus far, although two armature coils 42 each and a drive circuit for driving said armature coils 42 are separated into units with respect to coil substrate 40 and circuit substrate 50, three or more armature coils 42 and their drive circuit may also be separated into their respective units. In addition, although base substrate C 79, which supports twelve armature coils 42, and base substrate K 74, on which a plurality of drive circuits are arranged in a row corresponding to two of these armature coils 42 each, are made available during fabrication of the drive unit equipped with a total of fourteen armature coils 42 in the present embodiment, it is only natural that the setting of the total length of these base substrates K 74 and C 79, namely the number of armature coils and drive circuits to be equipped on these, can be suitably changed.

In addition, although coil substrate 40 and circuit substrate 50 are composed by separating at least one of separate portions 55 and 80 provided on base substrate K 74 and C 79, and joining it to unseparated base substrates K 74 and C 79 in the present embodiment, in the case the operating stroke of the drive unit to be fabricated is shorter than the total length of base substrates K 74 and C 79, at least one of each of separate portions 55 and 80 provided on each of said base substrates K 74 and C 79 should be cut away as necessary. In this manner, a substrate of desired length can be easily obtained simply by cutting away a portion from a base substrate and adding to another unseparated base portion or simply cutting away a portion of a base substrate. In addition, the remaining portion of the base substrate from which a portion was cut away as described above can be used for other applications irrespective of its state.

As shown in FIGS. 4 and 6, coil substrate 40 and circuit substrate 50, which are arranged to be mutually separated by bed 21 and coil yoke 23, are connected by connecting a plurality, in this case seven, of connection devices in the form of both corresponding male and female connectors 83 and 84 provided on mutually opposing sides of both said substrates. One each of these connectors 83 and 84 are arranged with respect to each separate portion 55 and 80 each provided with two armature coils 42 each and their drive circuit grouped into a unit as previously described. As shown in FIG. 4, said connectors 83 and 84 are mutually connected through apertures 21e and 23e formed in bed 21 and coil yoke 23. Thus, since one each of connectors 83 and 84 is provided for each of separate portions 55 and 80 of coil substrate 40 and circuit substrate 50, when mutually assembling both said separate portions 55 and 80, the directions of both can be recognized both quickly and easily, thus facilitating assembly work. Furthermore, connection of corresponding separate portions 55 and 80 may be performed by lead wires and not by connectors as described above. In addition, with respect to the number of connectors, besides providing only one connector for each of separate portions 55 and 80 as mentioned above, two or more connectors may also be provided.

On the other hand, the secondary side of the linear direct current motor is composed in the manner described below.

Figure 7:
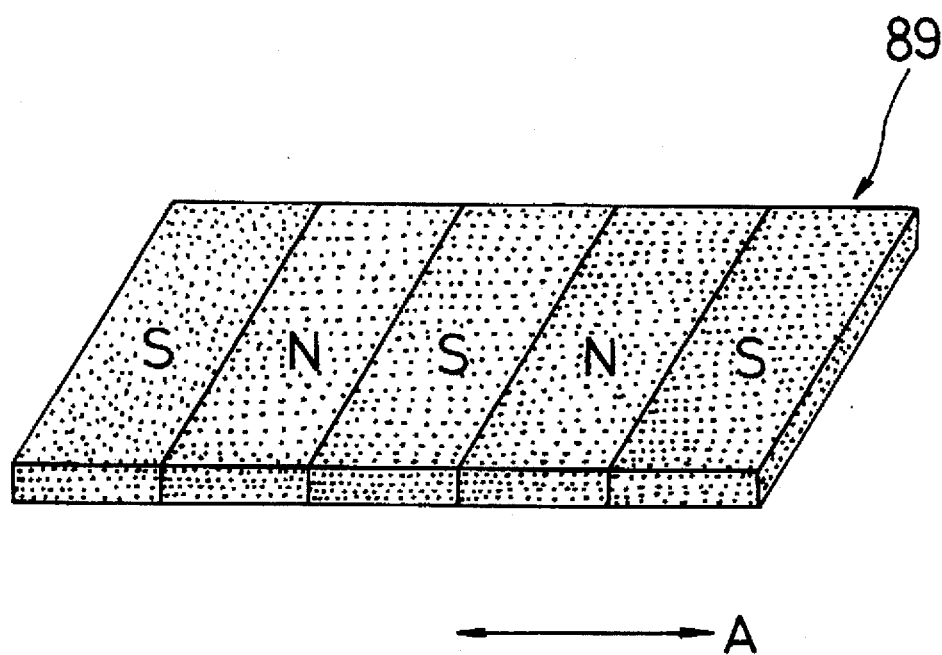
FIG. 7 is a perspective view of a field magnet that is a constituent member of the secondary side of the linear direct current motor contained in the drive unit shown in FIGS. 2 through 4.
Figure 8:
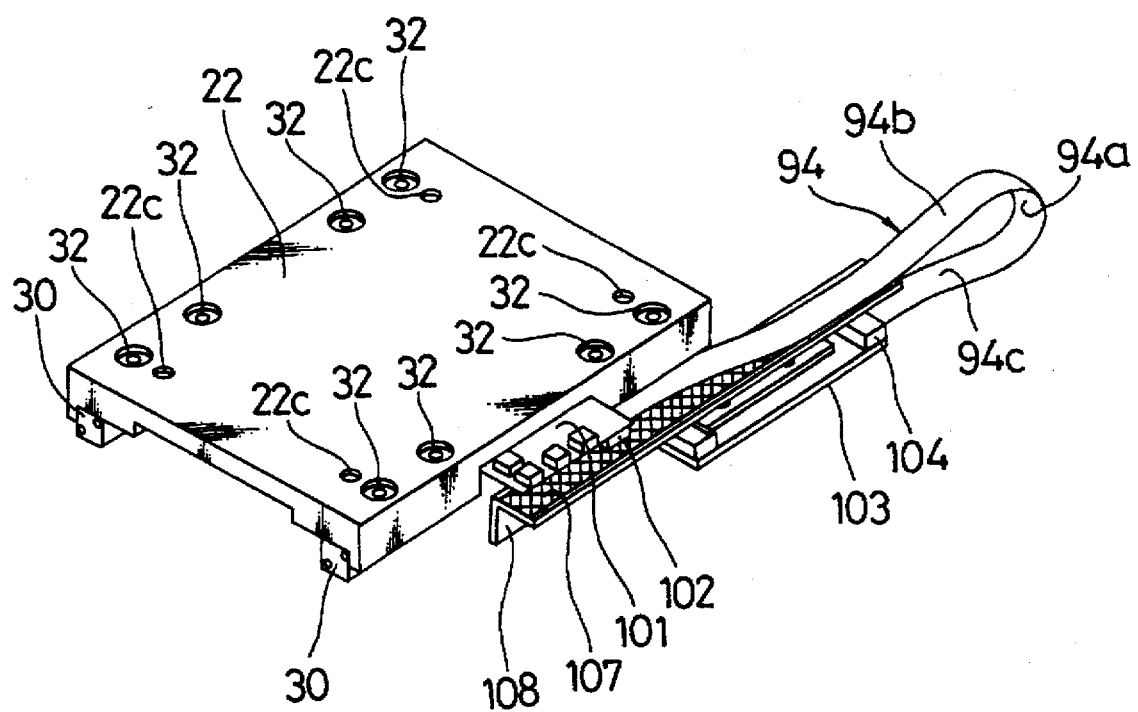
FIG. 8 is a perspective view of the essential portion of the drive unit shown in FIGS. 2 through 4.

As shown in FIGS. 2 and 4, said secondary side has magnet yoke 88, mounted on the lower surface of table 22, and field magnet 89 anchored on the lower surface of said magnet yoke 88 to oppose each of the above-mentioned armature coils 42 of the primary side. As shown in FIG. 7, the overall shape of field magnet 89 is formed into roughly that of a rectangular plate, and a plurality of N and S magnetic poles, for example 5, are magnetized so as to be alternately arranged in a row along direction A in which relative movement is performed by the primary and secondary sides, namely the lengthwise direction of bed 21.

In said drive unit, a detection device having the constitution described below is provided for detecting the relative positions of the above-mentioned primary and secondary sides, namely the relative positions of the above-mentioned bed 21 and table 22.

Namely, said detection device is composed of a detected portion in the form of linear magnetic scale 91 shown in FIGS. 2 through 4, and detecting portion 92 shown in FIG. 4. Said linear magnetic scale 91 extends in the direction of movement of the above-mentioned table 22, a large number of N and S magnetic poles are alternately magnetized at a precise pitch along its lengthwise direction, and an origin signal magnetized portion is formed on one end. Together with being provided with a magnetic resistance element (MR element, not shown) for origin detection, two magnetic conversion elements (not shown) consisting of two Hall effect elements for the A and B phases are arranged mutually shifted by ½ the above-mentioned pitch. As a result of employing said constitution, both A phase and B phase signals are obtained, thereby enabling detection of relative position and discrimination of direction of movement. As shown in FIGS. 2 through 4, said detection device is also provided with a flexible printed wiring substrate 94 for transmitting signals emitted from the above-mentioned detecting portion 92, and cover 95 for covering said printed wiring substrate 94.

In the drive unit having the above-mentioned constitution, by supplying a prescribed current to armature coils 42, thrust is produced based on Fleming's right hand rule between the primary and secondary sides. For example, if bed 21, to which the primary side is coupled, is taken to be the stationary side, table 22, integrated into a single unit with the secondary side, is moved by this thrust. Moreover, the position of table 22 with respect to bed 21 is detected by the detection device described above.

The following provides a detailed description of the constitution of the above-mentioned printed wiring substrate 94 and its periphery.

First, as was previously described, the following effects are obtained as a result of employing flexible printed wiring substrate 94 for the wiring of signal transmission and so forth.

Namely, since printed wiring substrate 94 is extremely lightweight, the amount of inertial force produced in said printed wiring substrate 94 based on the operation of the moving portion of a linear electromagnetic actuator (a linear direct current motor in the case of the present embodiment) or drive unit (this moving portion refers to the secondary side with respect to a linear direct current motor and to combination of slide member 30 and table 22 coupled to the said secondary side with respect to the drive unit) is small. In addition, since said printed wiring substrate itself is tough, it also has excellent durability. Thus, there is no risk of disconnection even when used at a high operation frequency or over an extended period of time.

In addition, since printed wiring substrate 94 is extremely lightweight as described above, the amount of resistance that acts on the operation of a linear electromagnetic actuator or drive unit is small, thus enabling the obtaining of a highly precise operating state.

Moreover, since printed wiring substrate 94 is relatively inexpensive, reduced cost of the apparatus is achieved.

In addition, since printed wiring substrate 94 is thin and only occupies a small amount of space, it facilitates reducing the size of the apparatus.

Next, an explanation is provided of the constitution provided to protect the above-mentioned printed wiring substrate 94 and so forth.

As was previously described, printed wiring substrate 94 is for transmitting signals by being juxtaposed in a bent state between the primary and secondary sides of a linear direct current motor. More specifically, as is shown in FIGS. 2, 4, 8 and 9, one end of printed wiring substrate 94 is connected via socket 102 to the leading end of substrate 101 anchored so as to protrude to the side on table 22 coupled to said secondary side. The other end is connected via socket 104 to the leading end of substrate 103 provided so as to protrude to the side on the stationary side in the form of bed 21 coupled to the above-mentioned primary side. Printed wiring substrate 94 is arranged so that the primary surface of the portion other than bent portion 94a, namely the primary surfaces of upper side 94b and lower side 94c positioned on both sides of said bent portion 94a, is roughly perpendicular to the vertical direction, namely the direction of gravity. In said constitution, printed wiring substrate 94 follows the secondary side accompanying movement of said secondary side with respect to the above-mentioned primary side. Furthermore, although obvious, the position of bent portion 94a of printed wiring substrate 94 changes accompanying movement of said secondary side, while the lengths of upper side 94b and lower side 94c also change.

As shown in FIGS. 2, 4, 8 and 9, film-shaped sliding member 107 is provided so as to be positioned between the upper and lower ends of the above-mentioned printed wiring substrate 94. Moreover, said sliding member 107 is adhered to the upper side of bracket 108, having an L-shaped cross-section, attached to the side of bed 21. More specifically, said sliding member 107 is formed into a rectangular shape as shown in the drawings, and is arranged so as to be able to slide with respect to printed wiring substrate 94 while also extending along the direction of movement of the above-mentioned secondary side. This sliding member 107 is formed into the form of a film from a material having a small coefficient of friction, an example of which is Teflon (TFET). Its thickness is set, for example, from 0.05 mm to 0.13 mm. Said sliding member 107 is adhered to the above-mentioned bracket 108 by using an adhesive (not shown) such as a silicone adhesive. The thickness of this adhesive layer is set, for example, from 0.03 mm to 0.05 mm.

Furthermore, in addition to using only Teflon (TFET) for the material of sliding member 107, a compound material may also be used in which a woven fabric consisting of fibers from a prescribed material are used as the core material and Teflon is coated around said core material. In addition, it is preferable that Teflon also be used for the material with respect to said fibers themselves.

As has been described above, the following effects are obtained as a result of employing printed wiring substrate 94 for the wiring for signal transmission.

Namely, since printed wiring substrate 94 is extremely lightweight, the amount of inertial force produced in said printed wiring substrate 94 based on the operation of the moving portion of a linear electromagnetic actuator or drive unit is small. In addition, since said printed wiring substrate itself is tough, it also has excellent durability. Thus, there is no risk of disconnection even when used at a high operation frequency or over an extended period of time.

In addition, since printed wiring substrate 94 is extremely lightweight as described above, the amount of resistance that acts on the operation of a linear electromagnetic actuator or drive unit is small, thus enabling the obtaining of a highly precise operating state.

Moreover, since printed wiring substrate 94 is relatively inexpensive, reduced cost of the apparatus is achieved.

In addition, since printed wiring substrate 94 is thin and only occupies a small amount of space, it facilitates reducing the size of the apparatus.

As was previously described, in said drive unit, sliding member 107 having a small coefficient of friction is juxtaposed between both ends of the above-mentioned printed wiring substrate 94 provided in a bent state, and said sliding member 107 is able to slide with respect to said printed wiring substrate 94. Moreover, said sliding member 107 is arranged to as to extend along the direction of relative movement of the primary and secondary sides equipped on a linear electromagnetic actuator. Namely, although this means that said printed wiring substrate 94 follows the relative movement of said primary and secondary sides, said sliding member 107 is juxtaposed between the upper and lower sides 94b and 94c located on both sides of bent portion 94a of printed wiring substrate 94.

Figure 9:
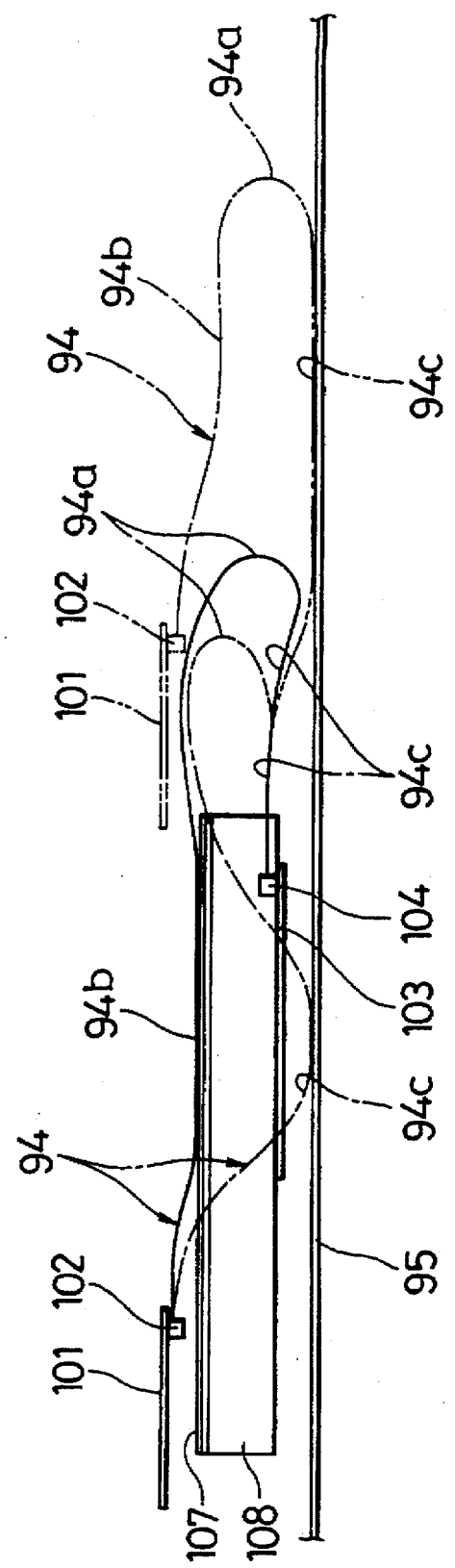
FIG. 9 is a side view for explaining the operation of the essential portion of the drive unit shown in FIGS. 2 through 4.

According to said constitution, since said sliding member 107 demonstrates the action of guiding printed wiring substrate 94, printed wiring substrate 94, and in this case its upper side 94b, is in the state indicated by the solid line and double dot broken line in FIG. 9. Thus, said printed wiring substrate 94 is not deflected into a form that is useless or complex. For this reason, contact by said upper side 94b with peripheral members, and specifically cover 95, as well as contact by lower side 94c is avoided. Thus, together with shorting and so forth being avoided based on wearing down of the substrate surface layer that is a cause of concern due to frequent repetition of contact over a long period of time, application of excessive force to printed wiring substrate 94 is prevented, thus enabling its function to be maintained for a long time. Incidentally, in the case the above-mentioned sliding member 107 is not provided, upper side 94b of printed wiring substrate 94 is greatly deflected as shown by the single dot broken line in FIG. 9, thus resulting in the risk of movement while making contact with cover 95.

Furthermore, although bottom side 94c of printed wiring substrate 94 makes contact with cover 95 as shown with the double dot broken line in FIG. 9, lower side 94c merely rides onto said cover 95 and does not move while sliding over it, thus not resulting in a problem.

The above-mentioned effect is particularly remarkable in the case the portions other than the bent portion of printed wiring substrate 94, namely the primary surfaces of the above-mentioned upper side 94b and lower side 94c, are arranged so as to be roughly perpendicular to the vertical direction as in the present embodiment. Namely, this is because, in the case printed wiring substrate 94 is arranged in this manner, since the direction in which deflection occurs in both said sides 94b and 94c is the direction of gravity, deflection is assisted by gravity.

In addition, in the linear electromagnetic actuator in the form of a linear direct current motor equipped on said drive unit, a detection device is provided that detects the relative positions of its primary and secondary sides. Said detection device has a detected portion in the form of a linear magnetic scale 91 attached to one side of either said primary or secondary sides, and in this case the primary side, and a detecting portion 92 that emits signals after detecting said detected portion that is attached to the other side with respect to said one side, and namely to the secondary side in this case. The above-mentioned printed wiring substrate 94 is provided to transmit signals emitted from said detecting portion 92. Namely, in the constitution of this type of detection device, magnetic sensors, such as electromagnetic conversion elements, or optical sensors are used for said detecting portion 92, and the above-mentioned signals are obtained in the form of weak current. Thus, said constitution is ideal as a result of using printed wiring substrate 94 which is not suited for transmission of large current.

However, the above-mentioned printed wiring substrate 94 is not limited to transmission of weak current in the form of the above-mentioned signals, but rather may also be used to transmit relatively large current that can be used for lighting lamps or driving objects.

Furthermore, although a guiding device having a mechanical constitution is shown for the guiding device that performs mutual guiding of the primary side and secondary side in the above-mentioned embodiment, a guiding device can be employed having a constitution that relatively levitates both primary and secondary sides by the pressure of a fluid (air or oil) or magnetic force.

Moreover, the present invention may be applied similarly in the form of another embodiment in the case of bed 21 and so forth having a certain curvature, and the present invention performing curved motion.

According to the present invention as has been explained above, the following advantages are offered as a result of employing a flexible printed wiring substrate as the wiring for signal transmission and so forth.

Namely, since the printed wiring substrate is extremely lightweight, the amount of inertial force produced in said printed wiring substrate 94 based on the operation of the moving portion of a linear electromagnetic actuator or drive unit is small. In addition, since said printed wiring substrate itself is tough, it also has excellent durability. Thus, there is no risk of disconnection even when used at a high operation frequency or over an extended period of time.

In addition, since the printed wiring substrate is extremely lightweight as described above, the amount of resistance that acts on the operation of a linear electromagnetic actuator or drive unit is small, thus enabling the obtaining of a highly precise operating state.

Moreover, since the printed wiring substrate is relatively inexpensive, reduced cost of the apparatus is achieved.

In addition, since the printed wiring substrate is thin and only occupies a small amount of space, it facilitates reducing the size of the apparatus.

In addition, in the present invention, a sliding member having a small coefficient of friction is juxtaposed between both ends of the above-mentioned printed wiring substrate provided in a bent state, and said sliding member is able to slide with respect to said printed wiring substrate. Moreover, said sliding member is arranged to as to extend along the direction of relative movement of the primary and secondary sides equipped on a linear electromagnetic actuator. Namely, although this means that said printed wiring substrate follows the relative movement of said primary and secondary sides, said sliding member is juxtaposed between two sides located on both sides of the bent portion of the printed wiring substrate. According to said constitution, since said sliding member demonstrates the action of guiding the printed wiring substrate, the printed wiring substrate is not deflected into a form that is useless or complex. For this reason, contact by the printed wiring substrate with peripheral members as well as between corresponding portions of the printed wiring substrate itself are avoided. Thus, together with shorting and so forth being avoided based on wearing down of the substrate surface layer that is a cause of concern due to frequent repetition of contact over a long period of time, application of excessive force to the printed wiring substrate 94 is also prevented, thus enabling its function to be maintained for a long time.

The above-mentioned effect is particularly remarkable in the case the portions other than the bent portion of the printed wiring substrate, namely the primary surfaces of the above-mentioned upper and lower sides, are arranged so as to be roughly perpendicular to the vertical direction. Namely, this is because, in the case the printed wiring substrate is arranged in this manner, since the direction in which deflection occurs in both of said sides is the direction of gravity, deflection is assisted by gravity.

In addition, in the linear electromagnetic actuator according to the present invention, a detection device is provided that detects the relative positions of its primary and secondary sides. Said detection device has a detected portion attached to one side of either said primary or secondary sides, and a detecting portion that emits signals after detecting said detected portion that is attached to the other side with respect to said one side. The above-mentioned printed wiring substrate is provided to transmit signals emitted from said detecting portion. Namely, in the constitution of this type of detection device, magnetic sensors, such as electromagnetic conversion elements, or optical sensors are used for said detecting portion, and the above-mentioned signals are obtained in the form of weak current. Thus, the present invention is ideal as a result of using a printed wiring substrate which is not suited for transmission of large current.

What is claimed is:

1. A linear electromagnetic actuator having a flexible printed wiring substrate that transmits signals, connected between a stationary side of the actuator and a moving side of the actuator, said actuator comprising:

a stationary, rigid member secured to the stationary side of the actuator, said member having a substantially flat upper surface with a low coefficient of friction, the flexible printed wiring substrate being supported on said flat upper surface in a predetermined bent state as the moving side moves relative to the stationary side.

2. A linear electromagnetic actuator as set forth in claim 1, wherein the moving side of the actuator moves in a horizontal plane relative to the stationary side of the actuator, and said flexible printed wiring substrate is disposed so that major surfaces of said flexible printed wiring substrate other than at a bent portion of said flexible printed wiring substrate are substantially parallel to said horizontal plane.

3. A linear electromagnetic actuator as set forth in claim 1, further comprising:

a detection device that detects the relative position of the moving side of the actuator with respect to the stationary side of the actuator, said detection device including a detected portion attached to one of the moving and stationary sides of the actuator, and a detecting portion that emits signals after detecting said detected portion, said detecting portion being attached to the other one of the moving and stationary sides of the actuator, wherein said flexible printed wiring substrate transmits the signals emitted by said detecting portion.

4. A drive unit that includes a linear electromagnetic actuator having a stationary side and a moving side, said drive unit comprising:

a flexible printed wiring substrate that transmits signals, connected between the stationary and moving sides of the actuator; and a stationary, rigid member secured to the stationary side of the actuator, said member having a substantially flat upper surface with a low coefficient of friction, the flexible printed wiring substrate being supported on said flat upper surface in a predetermined bent state as the moving side moves relative to the stationary side.

5. A linear electromagnetic actuator as recited in claim 1, wherein said flat upper surface is formed by a sliding member attached to said stationary, rigid member.

6. A linear electromagnetic actuator as recited in claim 5, wherein said sliding member comprises a film having a low coefficient of friction.

7. A linear electromagnetic actuator as recited in claim 6, wherein said film is made of Teflon material.

8. A linear electromagnetic actuator as recited in claim 5, wherein said sliding member is adhered to said stationary, rigid member with an adhesive.

9. A linear electromagnetic actuator as recited in claim 5, wherein said sliding member has a thickness of between about 0.03 mm and about 0.05 mm.

10. A linear electromagnetic actuator as recited in claim 5, wherein said sliding member comprises a woven fabric as a core material and Teflon material coated around the core material.

11. A linear electromagnetic actuator as recited in claim 10, wherein the woven fabric includes fibers made of the Teflon material.

12. A linear electromagnetic actuator as recited in claim 1, wherein said stationary, rigid member is a bracket.

13. A linear electromagnetic actuator as recited in claim 12, wherein said bracket has a substantially L-shaped cross section.

14. A linear electromagnetic actuator having a flexible printed wiring substrate that transmits signals, juxtapositioned in a bent state between and connecting primary and secondary sides that mutually perform relative movement, said actuator comprising:

a sliding member extending in a direction of relative movement of the primary and secondary sides, said sliding member having a surface with a low coefficient of friction, the printed wiring substrate being slidably supported on the surface of said sliding member.

* * * * *